Jan. 22, 1963     F. R. BENEDICT     3,074,461
ROLL FORMING SYSTEMS
Filed May 23, 1960                                                      6 Sheets—Sheet 1
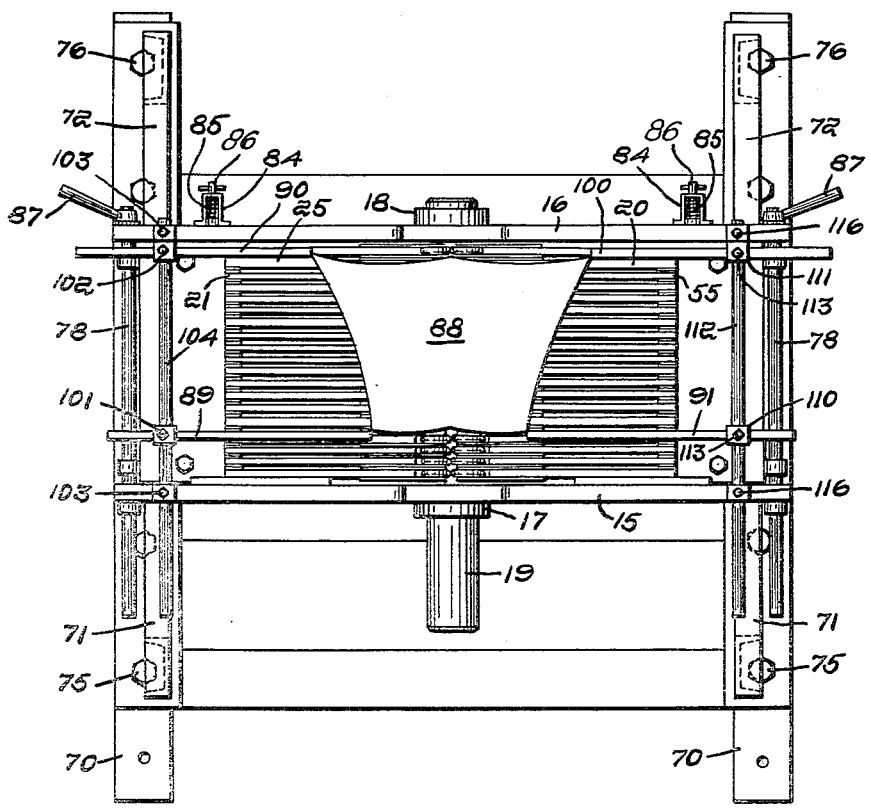
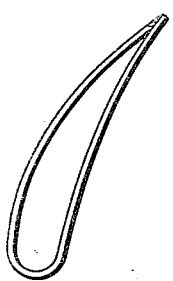
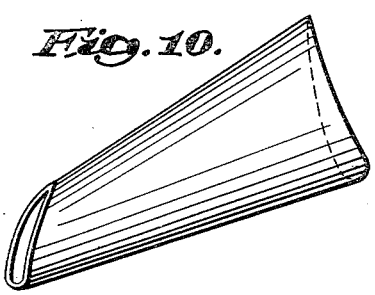
Inventor
Frank R. Benedict,
by Robert J. Palmer
Attorney

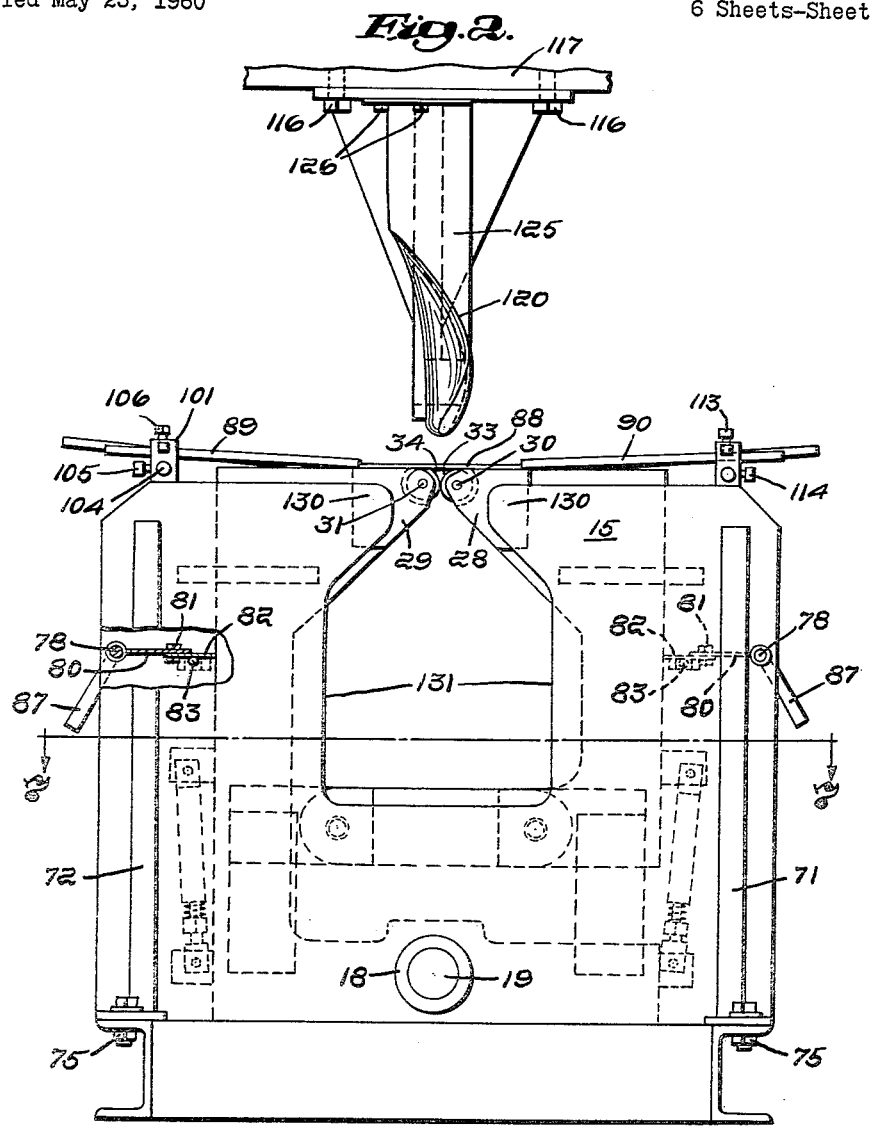

Jan. 22, 1963 F. R. BENEDICT 3,074,461
ROLL FORMING SYSTEMS
Filed May 23, 1960 6 Sheets-Sheet 3

Inventor:
Frank R. Benedict,
by Robert J. Palmer
Attorney

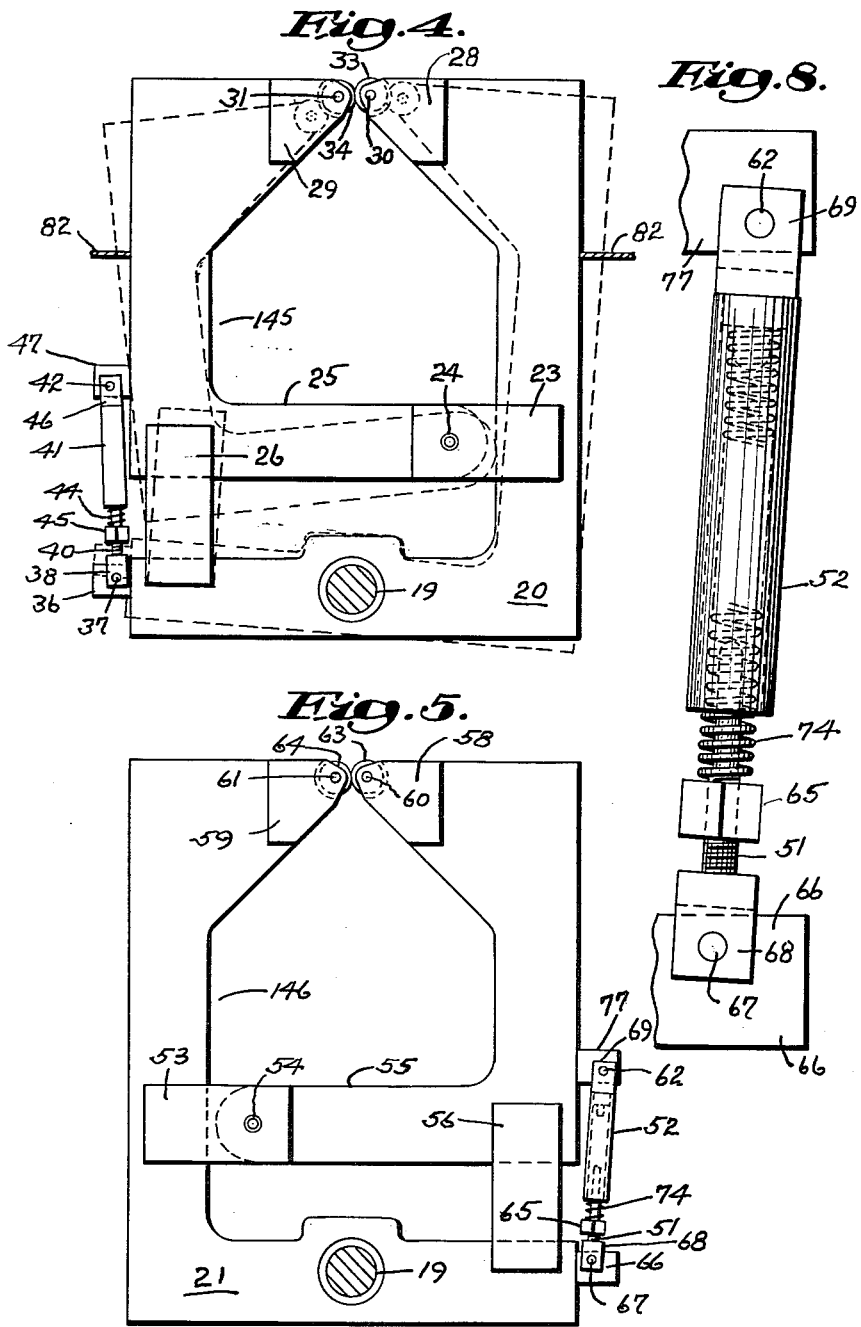

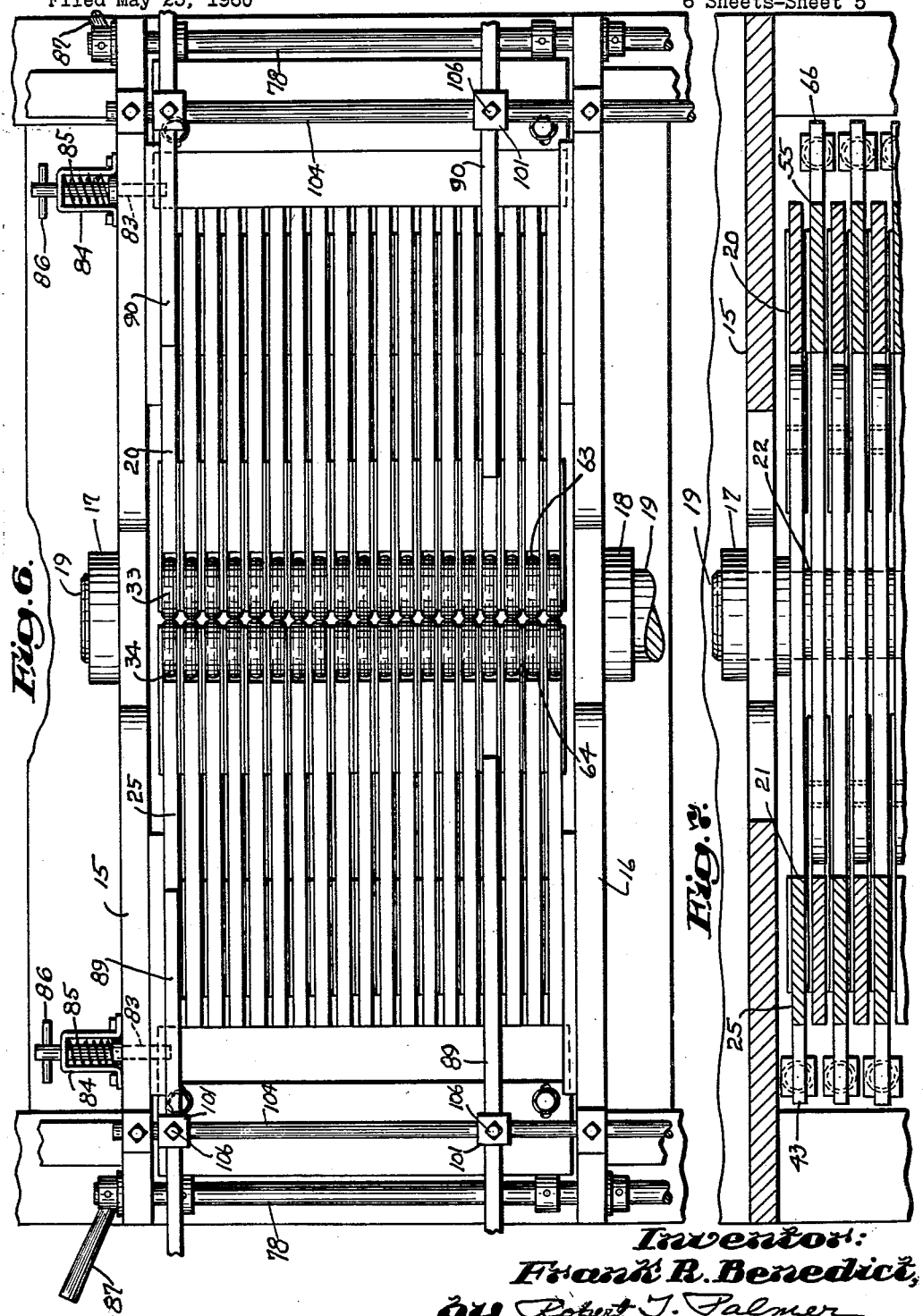

Inventor:
Frank R. Benedict,
By Robert J. Palmer
Attorney

United States Patent Office 3,074,461
Patented Jan. 22, 1963

3,074,461
ROLL FORMING SYSTEMS
Frank R. Benedict, Braintree, Mass., assignor to Westinghouse Electric Corporation, East Pittsburgh, Pa., a corporation of Pennsylvania
Filed May 23, 1960, Ser. No. 30,962
10 Claims. (Cl. 153—21)

This invention relates to the manufacture of blades used on the rotors of centrifugal and axial flow fans.

In the manufacture of different types of fans, many different forms of fan blades are used. Among such forms are (1) curved and contoured blades having uniform thicknesses; (2) constant chord airfoil blades without twist, and (3) variable chord airfoil blades with twist. Heretofore, a different machine and process have been used for manufacturing each of such forms of blades. Curved and contoured blades (1) have been formed by burning, machining and hot stretching apparatus. For each size and each shape of blade a different die is required. Constant chord airfoil blades without twist (2) have been formed by the hot roll forming of thin metal skins over mandrels. Variable chord airfoil blades with twist (3) have been cast solid either as separate blades or as complete rotors, or have been formed as hollow blades in complicated, expensive, butterfly dies. For each size and shape of blade a different die is required.

This invention provides a single roll system and process for forming not only the three different forms of blades described in the foregoing, but different sizes and shapes of such blades, without the use of dies.

An object of this invention is to reduce the cost of manufacture of fan blades.

Another object of this invention is to form in a single roll system, fan blades of different forms.

Another object of this invention is to form a single roll system, fan blades having different sizes and shapes.

This invention will now be described with reference to the annexed drawings, of which:

FIG. 1 is a plan view looking downwardly upon a roll system embodying this invention, with a metal blank in position to be deformed by a mandrel;

FIG. 2 is an end view of FIG. 1, and shows also a mandrel in position above the blank;

FIG. 4 is an end view of a pair of roll plates used as alternate roll plates in the roll system;

FIG. 5 is an end view of a pair of roll plates used as the other roll plates in the roll system;

FIG. 6 is an enlarged plan view looking downwardly on the roll system;

FIG. 7 is a fragmentary section along the lines 7—7 of FIG. 2;

FIG. 8 is an enlarged side view of one of the spring assemblies used to force the rolls towards each other;

FIG. 9 is an end view of a hollow airfoil blade formed in the roll system, and shows how the trailing ends of the blade are welded and smoothed to form a sharp trailing edge;

FIG. 10 is a side view of a hollow, variable chord, airfoil blade with twist, formed in the roll system;

Figure 3:
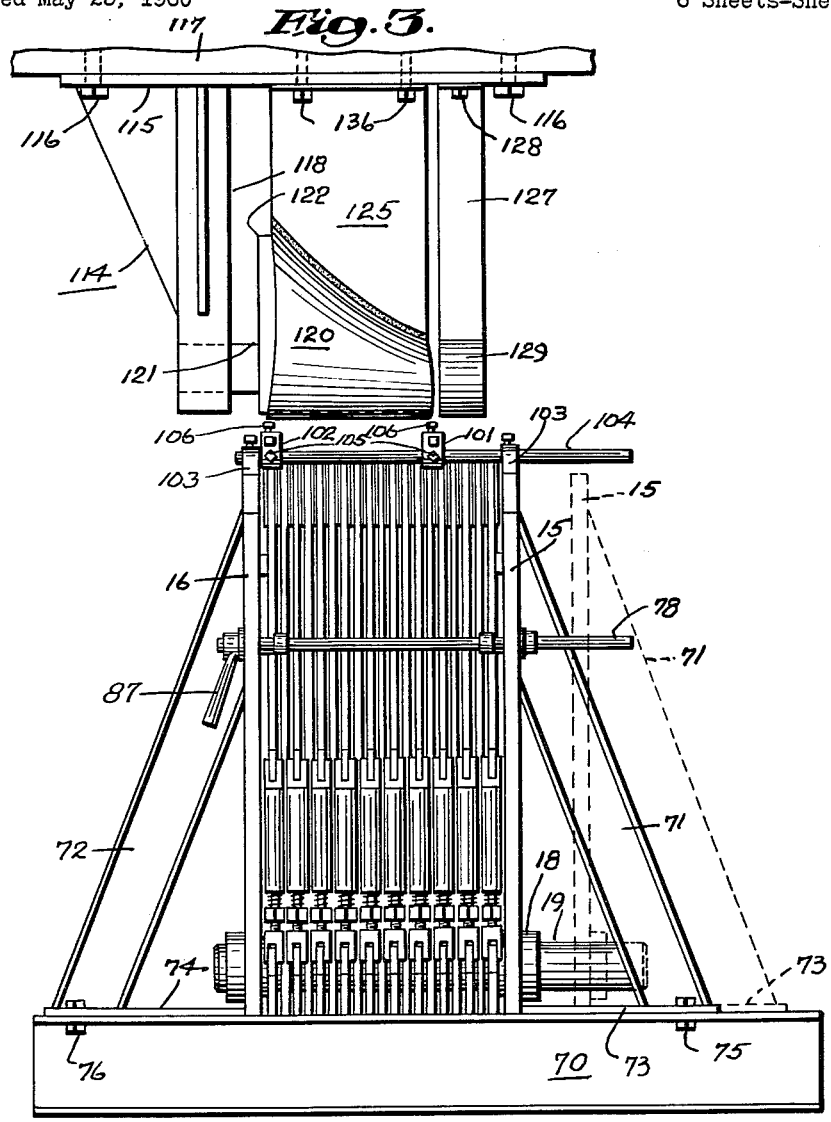
FIG. 3 is a side view of FIG. 2.

The roll system has spaced-apart end plates 15 and 16 with journals 17 and 18 respectively, which support a common pivot shaft 19. Rotatably supported on the shaft 19 are horizontally extending bottom portions of alternate roll plates 20 shown by FIG. 4, and the other roll plates 21 shown by FIG. 5. Free-floating, ring washers 22 on the shaft 19 space the plates 20 and 21 apart, the washers 22 being coated with a dry lubricant.

Each roll plate 20 has aligned straps 23 attached to its opposite sides, and through which extend a pivot shaft 24 on which is pivoted the horizontally extending bottom portion of its cooperating roll plate 25, the plates 20 and 25 being formed as pairs of roll plates. The bottom portion of each plate 25 is spaced above the bottom portion of its respective plate 20, and the latter has attached thereto on opposite sides thereof, the lower ends of aligned straps 26 which have upper portions which extend on opposite sides of the bottom portion of the plate 25, and which maintain the plate 25 in alignment with the plate 20 during the movement of the plate 25 about the pivot shaft 24. The upper portions of the roll plates 20 and 25 have facing portions to the sides of which are attached relatively thin plates 28 and 29 respectively, through which extend shafts 30 and 31 respectively, for forming rolls 33 and 34 respectively. Straps 36 are attached to opposite sides of the bottom portions of the plates 20 and extend outwardly therefrom. Lugs 38 are pivoted on rods 37 extending through the outer portions of the straps 36, and threaded in the lugs 38 are the lower end of rods 40. The upper ends of the rods 40 extend into cylinders 41, and have therearound coiled springs 44, the upper ends of which contact the inner surfaces of the closed tops of the cylinders, and the lower ends of which contact nuts 45 on the rods 40. The upper ends of the cylinders are attached to lugs 46 which are pivoted on rods 42 which extend through straps 47 which are attached to and extend outwardly from the plates 25 near their bottom portions. The springs 44 serve to force the rolls 34 towards the rolls 33 through the pivoting of the plates 25 about the pivot shafts 24.

Each roll plate 21 has aligned straps 53 attached to its opposite sides, and through which extend a pivot shaft 54 on which is pivoted the horizontally extending portion of the bottom of its cooperating roll plate 55, the plates 21 and 55 being formed as pairs of roll plates. The bottom portion of each plate 55 is spaced above the bottom portion of its respective plate 21, and the latter has attached on opposite sides thereof, the lower ends of aligned straps 56 which have upper portions which extend on opposite sides of the bottom portion of the plate 55, and which maintain the plate 55 in alignment with the plate 21 during the movement of the plate 55 about the pivot shaft 54. The upper portions of the roll plates 21 and 55 have facing portions to the sides of which are attached relatively thin plates 58 and 59 respectively, through which extend shafts 60 and 61 respectively, for forming rolls 63 and 64 respectively. Straps 66 are attached to opposite sides of the bottom portions of the plates 21 and extend outwardly therefrom. Lugs 68 are pivoted on rods 67 extending through the outer portions of the straps 66, and threaded in the lugs 68 are the lower ends of rods 51. The upper ends of the rods 51 extend into cylinders 52, and have therearound coiled springs 74, the upper ends of which contact the inner surfaces of the closed tops of the cylinders 52, and the lower ends of which contact nut 65 on the rods 51. The upper ends of the cylinders 52 are attached to lugs 59 which are pivoted on rods 63 which extend through straps 77 which are attached to and extend outwardly from the plates 55 near their bottom portions. The springs 74 serve to force the rolls 64 towards the rolls 63 through the pivoting of the plates 55 about the pivot shafts 54.

The pairs of roll plates 21 and 55 of FIG. 5 are seen to be similar to the pairs of roll plates 20 and 25 of FIG. 4, and differ therefrom only by being turned around so that the assemblies of the springs 74 of FIG. 5 are on opposite sides of the roll system from the assemblies of the springs 44 of FIG. 4. Some of the components of the spring assemblies are wider than the roll plates and their spacer washers 22 so that if all of the spring assemblies were placed on the same side of the roll system, the forming rolls would have to be placed further apart since to provide the necessary roll forming pressure, the sizes of the springs cannot be reduced. One of the reasons for the success of this invention is that it uses a large number of closely spaced, narrow forming rolls which contact the blade blanks at a large number of closely spaced areas so that the curves formed in the blanks are smooth and accurate.

Another reason for the success of this invention is that the forming rolls 33, 34, 63 and 64 are crowned at their rims to have smaller radii than their widths for preventing the edges of the rolls from contacting the blade blanks. If the usual cylindrical rolls were used to form blades with twist, the sharp edges of the rolls would contact the blade blanks and produce undesired distortion and damage.

The side plates 15 and 16 are supported on base members 70 by structural angles 71 and 72 respectively, which are bolted at 75 and 76 respectively, to the base members. As shown by the dashed lines of FIG. 3, the side plate 16 and its angle 71 and base plate 73 can be moved outwardly to permit additional pairs of roll plates to be added to the roll system when wider blades are to be formed.

Journalled in the side plates 15 and 16 beyond the ends of the roll plates, are pivot rods 78 and 79 to which are attached plates 80 which extend inwardly towards the roll plates. The plates 80 have bolted thereto at 81, stop plates 82 which, except when a blade is to be formed, contact the ends of the roll plates for maintaining their forming rolls in alignment for the rolling operation. The pairs of rolls are thus lined up on the roll contact centerline, and their axes are maintained in alignment. The stop plates 82 in such roll aligning position, rest on the inner ends of pins 83 which extend through the side plate 16 and brackets 84 attached to the outer side of the plate 16. Coiled springs 85 around the pins 83 between the plate 16 and the tops of the brackets 84, and maintain the inner ends of the pins under the stop plates 82. The outer ends of the pins 83 have handles 86 for enabling the inner ends of the pins to be withdrawn from under the stop plates 82 so that the stop plates 82 can be swung downwardly by handles 87 attached to the pivot rods 78, for permitting each roll pair to operate independently and take positions dictated by the shape of the mandrel being used.

FIGS. 1 and 2 show a flat, contoured, blade blank 88 in operating position on the roll system. For maintaining it accurately in this position, bars 89 and 90 are provided to contact at their inner ends, the opposite ends of the edge of the blade blank, and bars 91 and 100 are provided to contact at their inner ends, the opposite ends of the opposite edge of the blank. In this position, the centerline of the blade blank lies directly over the roll contact centerline. The bars 89 and 90 extend through clamps 101 and 102 respectively, through which a rod 104 extends, the clamps being bolted at 105 to the rod 104. The clamps are bolted to the bars 89 and 90 at 106. The rod 104 is clamped to the tops of the side plates 15 and 16 by clamps 103. The bars 91 and 100 extend through clamps 110 and 111 respectively, through which a rod 112 extends, the clamps 110 and 111 being bolted by bolts 113 to the rod 112, and by bolts 114 to the bars 91 and 100. The rod 112 is clamped to the tops of the side plates 15 and 16 by clamps 116. The bars 89, 90, 91 and 100 can be slidably adjusted to different positions towards and from the roll contact centerline for properly positioning different sizes and shapes of blade blanks, and the clamps 101 and 102 can be slidably positioned along the rod 104 for positioning different sizes and shapes of blade blanks. Likewise, the clamps 110 and 111 can be slidably positioned along the rod 112 to locate different sizes and shapes of blade blanks.

Referring now to FIGS. 2 and 3, for a varying chord, airfoiled shaped blade mandrel 120 with twist, a mandrel support 114 has a base 115 bolted at 116 to a vertically movable press member 117 of conventional design. The support 114 has a vertically extending portion 118 from which a shaft 121 horizontally extends, and which is attached through a plate 122 to the center of the large end of the mandrel. The trailing edge of the mandrel is located below the base 115, and between such edge and base is a plate 125 aligned with and having its lower edge attached as by welding to the upper edge of the mandrel. The upper end of the plate 125 is bolted at 126 to the base 115. The plate 125 aids in supporting the mandrel, but more important, it follows the mandrel through the rolls, and enables it to be easily withdrawn through the rolls after a formed blade has been removed from the mandrel. For the latter purpose, the bottom of the plate 125 need not be attached to the upper edge of the mandrel, and can be spaced a slight distance below the latter.

A given size of roll system may be used to form narrower blades than for which it was set up. As shown by FIG. 3, a mandrel 120 for such narrower blades will not contact all rolls of the roll system—those beyond the small end of the mandrel, and for preventing damage to the forming rolls which are not used, during the withdrawal of the mandrel from the roll system, a splitter sheet 127 is bolted at its upper end by a bolt 128 to the base 115, and has a lower portion 129 spaced slightly from the small end of the mandrel, and curved to follow the curvature of the chord line of the small end of the mandrel. On withdrawal of the mandrel, it and the splitter sheet 127 will contact all rolls of the roll system so that none can float free.

The side plate 16 has upper, facing portions 130 spaced apart to permit entry of the left portion (FIG. 3) of the mandrel support when the mandrel and the blade blank are passing through the forming rolls. The side plate 15 is similarly constructed since they are formed in pairs. Below the upper side plate portions 130 in both side plates, are large openings 131 having generally square lower portions which are opposite the ends of the mandrel with the formed blade thereon when the mandrel has reached the bottom of its stroke. The formed blade is pulled off the small end of the mandrel through the opening 131 in the side plate 15.

The pairs of roll plates 20 and 25 have openings 145 below their rolls, and the pairs of roll plates 21 and 55 have openings 146 below their rolls which are generally aligned with the openings 131 in the side plates 15 and 16.

When a formed blade is removed from the mandrel, its trailing edges are spaced apart. In a following operation, the spaced-apart, trailing edges are welded together, and then ground to provide the sharp trailing edge shown by FIG. 9.

FIG. 10 shows a variable chord, variable thickness, airfoil blade with twist formed in the roll system by the mandrel of FIGS. 2 and 3. Such blades are used in so-called propeller or axial-flow fans.

Figure 11:
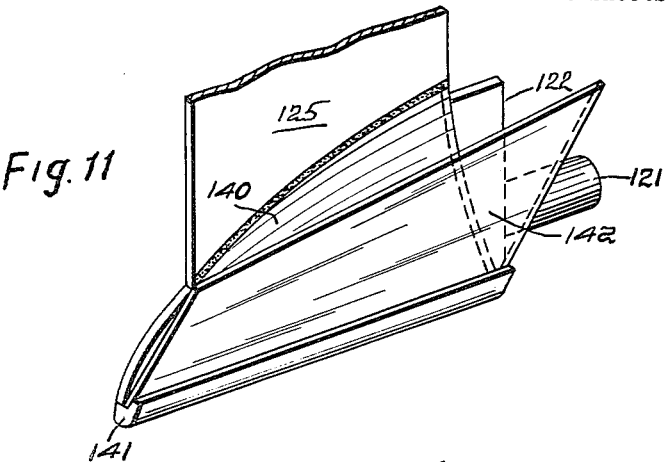
FIG. 11 is a view of a blade blank in position on a mandrel to be used with the roll system to form a contoured, constant thickness blade having twist.
Figure 12:
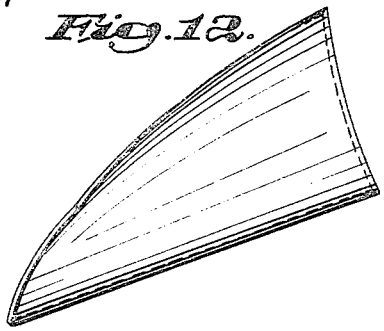
FIG. 12 is a side view of a blade formed by the use of the mandrel of FIG. 11 in the roll system.

Some types of fans have blades with uniform thickness which are curved and contoured as shown by FIG. 12. For forming such blades in the roll system, a mandrel 140 shown by FIG. 11, is formed to the desired curve and contour, and then has a hook rail 141 welded to its bottom edge. The bottom edge of a contoured blade blank 142 is placed in the recess between the hook rail and the bottom edge of the mandrel 140. The blade is then held down in the recess by pressure exerted from above, as by a hand held tool, until rolling starts, following which friction between the blade blank and the mandrel maintains the blade blank in proper position.

*Operation*

At the start of a blade forming operation, using the mandrel of FIGS. 2 and 3, the blade blank 88 shown by FIGS. 1 and 2, which previously would have been heated, is placed on the roll system with its centerline aligned with the roll contact centerline, and is held in this position by the locater bars 89, 90, 91 and 100 as shown by FIGS. 1 and 2. Since the top edges of the forming rolls are flush with the top surfaces of the forming rolls, the blade blank rests in a horizontal position on the aligned top edges of the forming plates and the top surfaces of the forming rolls.

The stop plates 82 would previously have been swung up against the side edges of the roll plates as shown by FIGS. 2 and 4, and maintained in this position by the pins 83.

The mandrel is moved downwardly by the press member 117 against the blade blank 88 and presses the latter against the rolls, forming a slight curvature in the blank along its centerline, such curvature placing a slight opening force on each roll pair, causing them to line up with the centerline of the mandrel, and at the same time holding them in position so that the stop plates 82 can be swung away from the edges of the roll plates to permit the mandrel to move further downwardly to move the blade blank between the forming rolls. The rolls 33 and 64 are moved outwardly by the pivoting of the roll plates 20 and 21 respectively, about the central pivot shaft 19, and the rolls 34 and 63 are moved outwardly by the pivoting of the roll plates 25 and 55 respectively, about the pivot shafts 24 and 54 respectively. The springs 44 and 74 oppose this outward movement of the rolls, and provide the pressure which causes the blade blank to be formed to the shape of the mandrel. Since the mandrel varies in thickness, chord and twist, the pivoting of the roll plates 25 and 55 about the shafts 24 and 54 respectively, permits their forming rolls to float free, and to take positions to fit the varying shape of the mandrel.

The plate 125 attached to the trailing edge of the mandrel, follows it through the rolls. The splitter sheet 127 passes between the unused rolls.

When the mandrel has reached the bottom of its stroke, the formed blade is removed through the opening 131 in the side plate 15, and has its trailing edges welded and ground to provide a sharp trailing edge as shown by FIG. 9. Following this, the mandrel is retracted, the plate 125 spacing the rolls apart so that they permit the trailing edge of the mandrel to pass easily between the rolls.

The formation of a uniform thickness blade with twist by the mandrel of FIG. 11 would proceed in the same manner.

A mandrel for a constant chord airfoil without twist is not shown since such has been used successfully by me for several years with a different roll system. The problems involved in the formation of blades with twist do not exist when blades without twist are formed. The roll system of this invention enables blades without twist and blades with twist to be formed for the first time in a single roll system.

Figure 13:
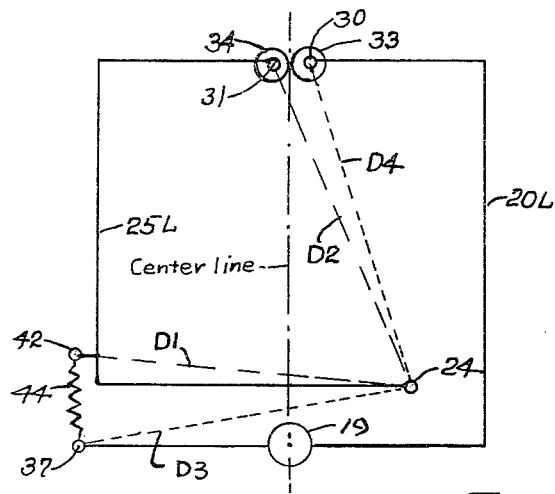
FIG. 13 is a diagrammatic view corresponding to FIG. 4.

FIG. 13 shows diagrammatically the lever and spring system used in this invention. There are two lever arms 20L and 25L hinged at 24 to each other, and hinged as a pair at 19 centrally below the rolls 33 and 34. The spring 44 pushes the arms 20L and 25L apart about the hinge 24, and forces the rolls towards each other.

The lever system is arranged to have a mechanical advantage of not less than one so that the best use of a given spring 44 results. If a mechanical advantage of less than one is used, the spring must be stronger and so, too large for a thin roll plate, or the lever arms on the spring side must be longer in which case the size of the roll system is increased.

It is preferred that the moment arms D1, D2, D3 and D4 of FIG. 13 have substantially the same length. If D1 and D3 are longer than D2 and D4 respectively, a mechanical advantage greater than one is obtained but the size of the system is increased. If D1 and D3 are shorter than D2 and D4 respectively, a mechanical advantage of less than one is obtained.

By supporting each pair of roll plates on a central shaft 19 below the center of gravity of the roll system, horizontal side forces which might cause the mandrel to bend and produce inaccurately formed blades are eliminated. This also enables the roll plates easily to be aligned and held in alignment by the stop plates 82 since the side forces are negligible. Also, the central, common pivot allows each pair of rolls to follow independently a different chord line of the mandrel.

What is claimed, is:

1. A roll system comprising a pair of aligned roll plates having aligned, spaced-apart portions at corresponding ends, a pair of normally contacting, aligned rolls supported for rotation by said portions, said rolls having contacting portions extending into the space between said plate portions, a frame, means pivoting one of said plates from said frame, additional means pivoting the other of said plates from said one plate, and spring means attached to said plates for forcing said rolls together.

2. A roll system comprising a pair of aligned roll plates having aligned, spaced-apart portions at corresponding ends, a pair of normally contacting rolls supported for rotation by said portions said rolls having contacting portions extending into the space between said plate portions, said plates having spaced-apart, aligned opposite end portions, a frame, means pivoting one of said opposite end portions from said frame, additional means pivoting the other of said opposite end portions from said one opposite end portion, and spring means extending across the space between said opposite end portions and attached at its ends to said plates.

3. A roll system comprising a plurality of parallel, slightly spaced-apart, pairs of roll plates, each of said pairs comprising aligned plates having aligned, spaced-apart portions at corresponding ends, having a pair of normally contacting rolls supported for rotation by said plate portions, common pivot additional means for one plate of each pair, means for pivoting the other plate of each pair from said one plate of each pair, and spring means for each of said pairs attached to the plates of each pair for forcing the rolls of each pair together.

4. A roll system comprising a plurality of parallel, slightly spaced-apart, pairs of roll plates, each of said, pairs comprising aligned plates having aligned, spaced-apart portions at corresponding ends, having a pair of normally contacting rolls supported for rotation by said plate portions, said rolls having contacting portions extending into the spaces between said plate portions, common pivot means for one plate of each pair, additional means for pivoting the other plate of each pair from said one plate of each pair, one plate of each pair having another portion spaced from another portion of the other plate of each pair, and spring means for each of said pairs of plates extending across the space between said other portions and attached at its ends to said other portions.

5. A roll system comprising a plurality of parallel, slightly spaced-apart, pairs of roll plates, each of said pairs comprising aligned plates having aligned, spaced-apart portions at corresponding ends and having a pair of aligned, normally contacting rolls supported for rotation by said plate portions, said rolls having contacting portions extending into the spaces between said plate portions, a pivot shaft extending through one plate of each pair of plates, said plates having side edges on opposite sides of a plane extending through the axis of said shaft and the line of contact of said rolls, and means movable in contact with said side edges for maintaining said side edges in alignment and movable from said side edges to permit independent movement of said plates.

6. A roll system comprising a pair of pivoted, aligned roll plates having aligned, spaced-apart portions at corresponding ends, a pair of normally contacting, aligned rolls supported for rotation by said plate portions and having contacting portions extending into the space between said plate portions, said rolls and said plates having substantially the same widths, and the peripheries of said rolls being curved transversely in circular arcs.

7. A roll system for forming a fan blade from a metal blank, comprising a plurality of pivoted, parallel, slightly spaced-apart, pairs of roll plates, each of said pairs comprising aligned plates having aligned, spaced-apart portions at corresponding ends, and having a pair of rolls normally in contact, supported for rotation by said plate portions spring means for each of said pairs for forcing said rolls together, a mandrel for forcing a blade blank between said rolls of said pairs of rolls, a plate aligned with and extending rearwardly from the trailing edge of said mandrel, and means for supporting said mandrel for movement towards and from said rolls with its nose parallel to the line of contact of said rolls, and for supporting said last mentioned plate for movement with said mandrel.

8. A roll system for forming a fan blade from a metal blank, comprising a plurality of pivoted, parallel, slightly spaced-apart, pairs of roll plates, each of said pairs comprising aligned plates having aligned, spaced-apart portions at corresponding ends, and having a pair of normally contacting, aligned rolls supported for rotation by said plate portions, spring means for each of said pairs for forcing said rolls together, a curved, twisted plate forming a mandrel for forcing a metal blade blank between the rolls of said pairs, a hook rail attached to and forming the nose of said mandrel, said rail and said curved plate forming a recess for receiving a metal blade blank, and means for supporting said curved plate for movement towards and from said rolls with its nose parallel to the line of contact of said rolls.

9. A roll system comprising a pair of aligned roll plates having aligned, spaced-apart portions at corresponding ends, a pair of normally contacting rolls supported for rotation by said plate portions, said rolls having contacting portions extending into the space between said plate portions, one of said plates having an opposite end portion, a pivot shaft for said one plate extending through said opposite end portion, the axes of said rolls extending parallel to the axis of said shaft, the other of said plates having an opposite end portion spaced towards said rolls from said opposite end portion of said one plate, means pivoting said opposite end portion of said other plate from said opposite end portion of said one plate, and spring means attached at its ends to said opposite end portions and extending outwardly beyond said opposite end portions across the space between said opposite end portions.

10. A roll system comprising a plurality of parallel, slightly spaced-apart, pairs of roll plates, each of said pairs comprising aligned plates having aligned spaced-apart portions at corresponding ends, a pair of normally contacting rolls supported for rotation by said plate portions said rolls having contacting portions extending into the spaces between said plate portions, a first plate of each of said pairs of roll plates having an opposite end portion, a pivot shaft extending through said opposite end portions, the second plate of each of said pairs of roll plates having an opposite end portion spaced towards said rolls from said opposite end portion of said first plate, alternate ones of said opposite end portions of said second plates being pivoted to said opposite end portions of alternate ones of said first plates to one side of a plane extending through the axis of said shaft and the line of contact of said rolls, the others of said opposite end portions of said second plates being pivoted to said opposite end portions of the other ones of said first plates to the other side of said plane, spring means for each of said pairs of roll plates, alternate ones of said spring means being attached at their ends to said alternate opposite end portions, and extending outwardly beyond the side edges of said alternate end portions, and the other ones of said spring means being attached at their ends to said other opposite end portions, and extending outwardly beyond the side edges of said other opposite end portions which are opposite to said side edges of said alternate opposite end portions.

References Cited in the file of this patent

UNITED STATES PATENTS

| 1,045,089 | Belding et al. | Nov. 19, 1912 |
| 2,418,100 | Stewart | Mar. 25, 1947 |
| 2,924,260 | Guarino | Feb. 9, 1960 |

FOREIGN PATENTS

| 558,378 | Great Britain | Jan. 3, 1944 |
| 561,556 | Great Britain | May 24, 1944 |